(12) United States Patent
He et al.

(10) Patent No.: US 8,831,012 B2
(45) Date of Patent: Sep. 9, 2014

(54) DETERMINING PATHS IN A NETWORK WITH ASYMMETRIC SWITCHES

(75) Inventors: Min He, San Jose, CA (US); Kevin Zhu, San Jose, CA (US); Srinivas Vobilisetti, Santa Clara, CA (US); Takao Naito, Plano, TX (US); Paparao Palacharla, Richardson, TX (US); Xi Wang, Murphy, TX (US); Qiong Zhang, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 762 days.

(21) Appl. No.: 12/574,972

(22) Filed: Oct. 7, 2009

(65) Prior Publication Data

US 2011/0080846 A1    Apr. 7, 2011

(51) Int. Cl.
| | | |
|---|---|---|
| H04L 12/28 | (2006.01) | |
| H04L 12/46 | (2006.01) | |
| H04L 12/701 | (2013.01) | |
| H04L 12/721 | (2013.01) | |
| H04L 12/735 | (2013.01) | |
| H04L 12/707 | (2013.01) | |
| H04Q 3/66 | (2006.01) | |

(52) U.S. Cl.
CPC .............. *H04L 12/462* (2013.01); *H04L 45/00* (2013.01); *H04L 45/12* (2013.01); *H04L 45/128* (2013.01); *H04L 45/22* (2013.01); *H04Q 3/66* (2013.01); *H04Q 2213/13141* (2013.01); *H04Q 2213/13148* (2013.01)
USPC ........................................................ 370/401

(58) Field of Classification Search
CPC . H04L 12/462; H04L 12/4633; H04L 45/128; H04L 45/1283; H04L 45/1287
See application file for complete search history.

(56) References Cited

U.S. PATENT DOCUMENTS

| | | | | |
|---|---|---|---|---|
| 7,577,099 | B1 * | 8/2009 | Greenberg et al. | 370/242 |
| 2005/0063309 | A1 * | 3/2005 | Alicherry et al. | 370/238 |
| 2006/0002291 | A1 * | 1/2006 | Alicherry et al. | 370/225 |
| 2009/0285574 | A1 * | 11/2009 | Liu | 398/2 |

OTHER PUBLICATIONS

Bhandari, Ramesh, "Survivable Networks: Algorithms for Diverse Routing", Kluwer Academic Publishers, Section 3.3.4 Edge-Disjoint Shortest Pair Algorithm, pp. 64-66, 1999.
Todimala, Ajay, et al., "IMSH: An Iterative Heuristic for SRLG Diverse Routing in WDM Mesh Networks", Department of Computer Science and Engineering, University of Nebraska-Lincoln, pp. 1-6, 2004.
Bernstein, Greg M., Modeling WDM Wavelength Switching Systems for use in Automated Path Computation, http://www.grotto-networking.com/wson/ModelingWSONswitchesV2a.pdf, pp. 1-7, 2008.

\* cited by examiner

*Primary Examiner* — Jae Y Lee
(74) *Attorney, Agent, or Firm* — Baker Botts L.L.P.

(57) ABSTRACT

According to particular embodiments, determining paths in a network with asymmetric switches includes receiving a graph representing the network. Each asymmetric switch has defined degree connectivity between one or more pairs of degrees of the asymmetric switch. The graph is transformed to yield a transformed graph that accounts for the asymmetric switches. A routing process is applied to the transformed graph to yield one or more paths through the network.

20 Claims, 4 Drawing Sheets

DETERMINING PATHS IN A NETWORK WITH ASYMMETRIC SWITCHES

TECHNICAL FIELD

This invention relates generally to the field of communication networks and more specifically to determining paths in a network with asymmetric switches.

BACKGROUND

A switch may be symmetric or asymmetric. In a symmetric switch, pass-through traffic can flow from any degree to any other degree. In an asymmetric switch, pass-through traffic can flow from an input degree to an output degree only if degree connectivity between the degrees has been explicitly defined, for example, by a user. Determining paths in network with asymmetric switches may pose challenges.

SUMMARY OF THE DISCLOSURE

In accordance with the present invention, disadvantages and problems associated with previous techniques for determining disjoint paths may be reduced or eliminated.

According to particular embodiments, determining paths in a network with asymmetric switches includes receiving a graph representing the network. Each asymmetric switch has defined degree connectivity between one or more pairs of degrees of the asymmetric switch. The graph is transformed to yield a transformed graph that accounts for the asymmetric switches. A routing process is applied to the transformed graph to yield one or more paths through the network.

Certain embodiments of the invention may provide one or more technical advantages. A technical advantage of one embodiment may be that a graph of a network with asymmetric switches may be transformed and used to determine paths for the network. Another technical advantage of one embodiment may be that a Shared Risk Group disjoint shortest path routing process may be applied to the transformed graph to determine disjoint paths for the network. Another technical advantage of one embodiment may be that the process may apply to intra-connected switches as well as asymmetric switches.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
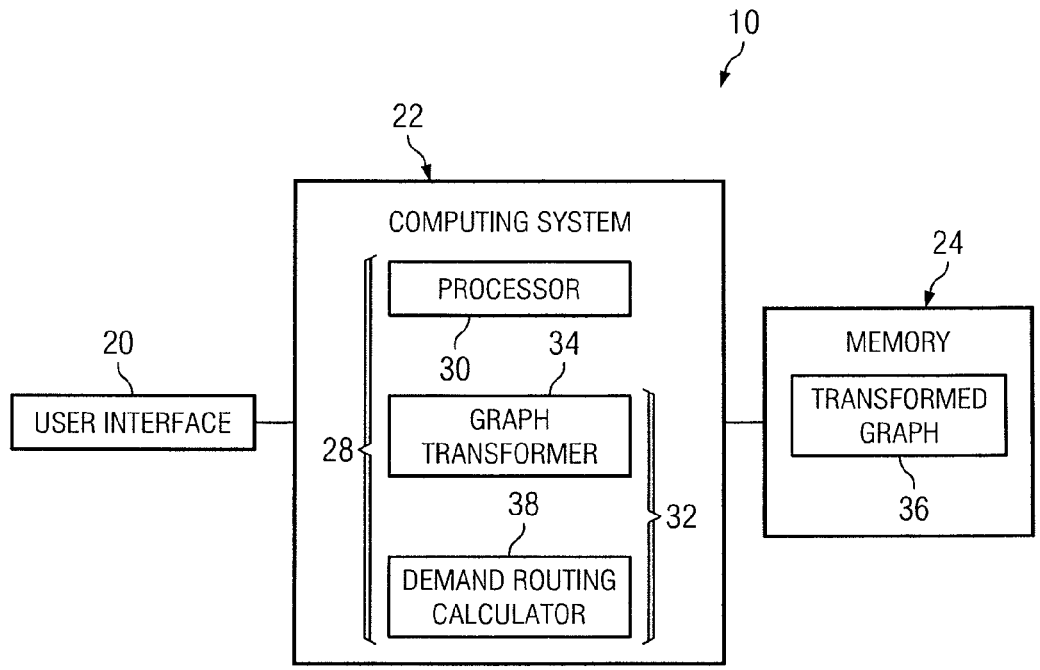
FIG. 1 illustrates one embodiment of a system that may be used to facilitate routing in networks with asymmetric switches.

FIG. 1 illustrates one embodiment of a system 10 that may be used to facilitate routing in networks with asymmetric switches. In certain embodiments, system 10 may transform a graph of a network with asymmetric nodes. System 10 may apply a Shared Risk Group disjoint shortest path routing process to the transformed graph to determine disjoint paths for the network. System 10 may treat intra-connected switches as asymmetric switches in order to determine paths.

In certain embodiments, the network may be a communication network. A communication network allows nodes to communicate with other nodes. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

A communication network comprises nodes and links. A node may be a network element that facilitates communication of signals as the signals travel along paths. Examples of network elements include routers, switches, reconfigurable optical add-drop multiplexers (ROADMs), wavelength division multiplexers (WDMs), access gateways, intra-connected switch pair, endpoints, softswitch servers, trunk gateways, a network management system, or other device configured to route packets through, to, or from a network.

In particular embodiments, a signal travels along a path from a source node through zero, one, or more intermediate nodes to a destination node. A node may add a signal to a network, drop a signal from the network, and/or allow a signal to pass through the node. In particular embodiments, a node may be an add/drop node that adds and/or drops a signal to the network. A node may be a pass-through node that passes through a signal, but does not add or drop a signal to the network. A link transports a signal from one node to the next node, and may comprise any fiber operable to transport a signal, such as an optical fiber.

In particular embodiments, a node may be a symmetric or asymmetric switch. A switch has degrees that operate as inputs and/or outputs of the switch. A switch may have a degree connection, or degree connectivity, between a pair of degrees that allows traffic to flow from the first degree to the second degree and/or flow from the second degree to the first degree. In a symmetric switch, pass-through traffic can flow from any degree to any other degree. In an asymmetric switch, pass-through traffic can flow from an input degree to an output degree only if degree connectivity between the degrees has been explicitly defined, for example, by a user.

In particular embodiments, nodes may include an intra-connected switch pair that may be regarded as an asymmetric switch. An intra-connected switch pair comprises switches that are connected together. Typically, traffic enters an input degree of one switch, flows to the other switch, then exits from an output degree of the other switch. In an intra-connected switch pair, pass-through traffic can flow from the input degree to the output degree only if degree connectivity between the degrees has been explicitly defined, for example, by a user. In particular embodiments, an intra-connected switch pair may be subject to constraints, such as add/drop constraints. For example, traffic from one switch cannot drop at the other switch, and vice versa.

In particular embodiments, a graph may represent a network. Accordingly, a graph includes representations of nodes and links. As a shorthand in this document, a graph may be described as including nodes and links, instead of representations of nodes and links.

In the illustrated embodiment, system 10 includes a user interface 20, a computing system 22, and a memory 24. Computing system 22 includes logic 28 such as processor 30 and applications 32. Applications 32 include a graph transformer 34 and a demand routing calculator 38. Memory stores a transformed graph 36.

In particular embodiments, graph transformer 34 transforms a graph to yield transformed graph 36. In the embodiments, the graph represents a network that has one or more asymmetric switches. Transformed graph 36 takes into account the asymmetric switches, and may allow for routing processes to be applied to transformed graph 36. The transformation may use any suitable graph transformation rules. Examples of graph transformation rules are described in more detail with reference to FIGS. 2A and 2B.

In particular embodiments, transformed graph 36 has virtual links that represent degree connectivity. The virtual links of a node may belong to a shared risk group (SRG). An SRG-disjoint routing process may be applied to yield SRG-disjoint paths. The disjoint path routing process may be an NP-complete problem with the SRGs.

In particular embodiments, demand routing calculator applies a routing process (such as a routing algorithm) to transformed graph 36 determine paths of the network represented by graph 36. Any suitable routing process, such as a demand routing process, may be used. Examples of a routing processes are described in more detail with reference to FIGS. 3 and 4.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 2A:
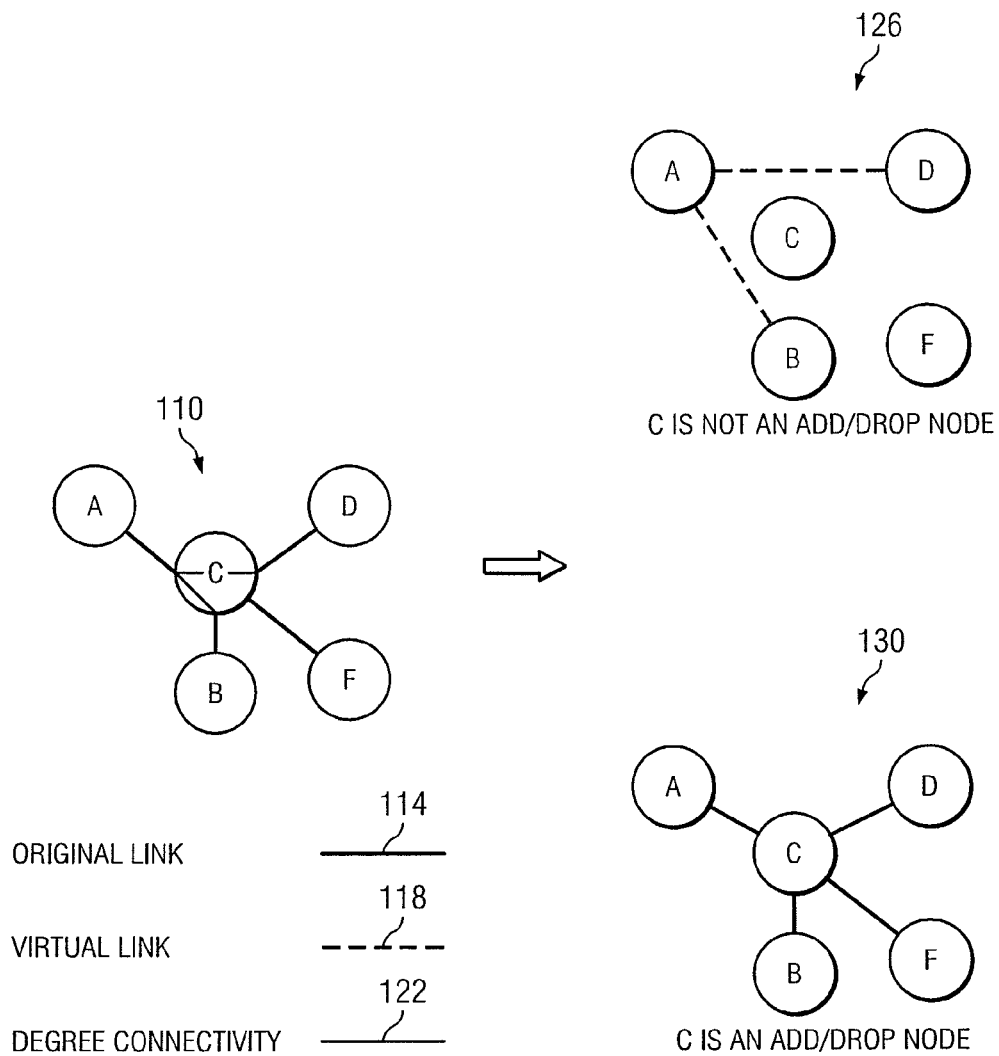
FIGS. 2A and 2B illustrate example graphs to which graph transformation rules for asymmetric switches may be applied.

FIG. 2A illustrates an example graph 110 to which a graph transformation rule for asymmetric switches may be applied to yield transformed graphs 126 and 130. A graph may include nodes A, B, . . . , F, original links 114, virtual links 118, and/or degree connectivity 122. In the example, node C has degree connectivity between nodes A and B and between nodes A and D.

In the example, node C may be a pass-through node (i.e., not an add/drop node) or an add/drop node. If node C is a pass-through node, then virtual links 118 are added to yield transformed graph 126. Each virtual link 118 represents defined degree connectivity between a pairs of degrees of node C. In the example, virtual links 118 are added between nodes A and B (virtual link AB) and between nodes A and D (virtual link AD). Virtual links 118 representing original links 114 that pass through the same node may be placed in the same shared risk group. In the example, virtual links AB and AD) are in the same shared risk group.

If node C is an add/drop node, node C may maintain defined degree connectivity 122. An add/drop node may allow any-degree to any-degree connectivity by electrical-optical-electrical conversion during traffic aggregation (but there may be limited degree connectivity in the optical layer). Accordingly, an add/drop node may be regarded as a symmetric switch, as in transformed graph 130 and may maintain degree connectivity 122 of a symmetric switch, that is, degree connectivity 122 that connect all pairs of degrees of the node may be maintained. In the example, original links 114 AC, CD, CB, and CF are maintained.

Figure 2B:
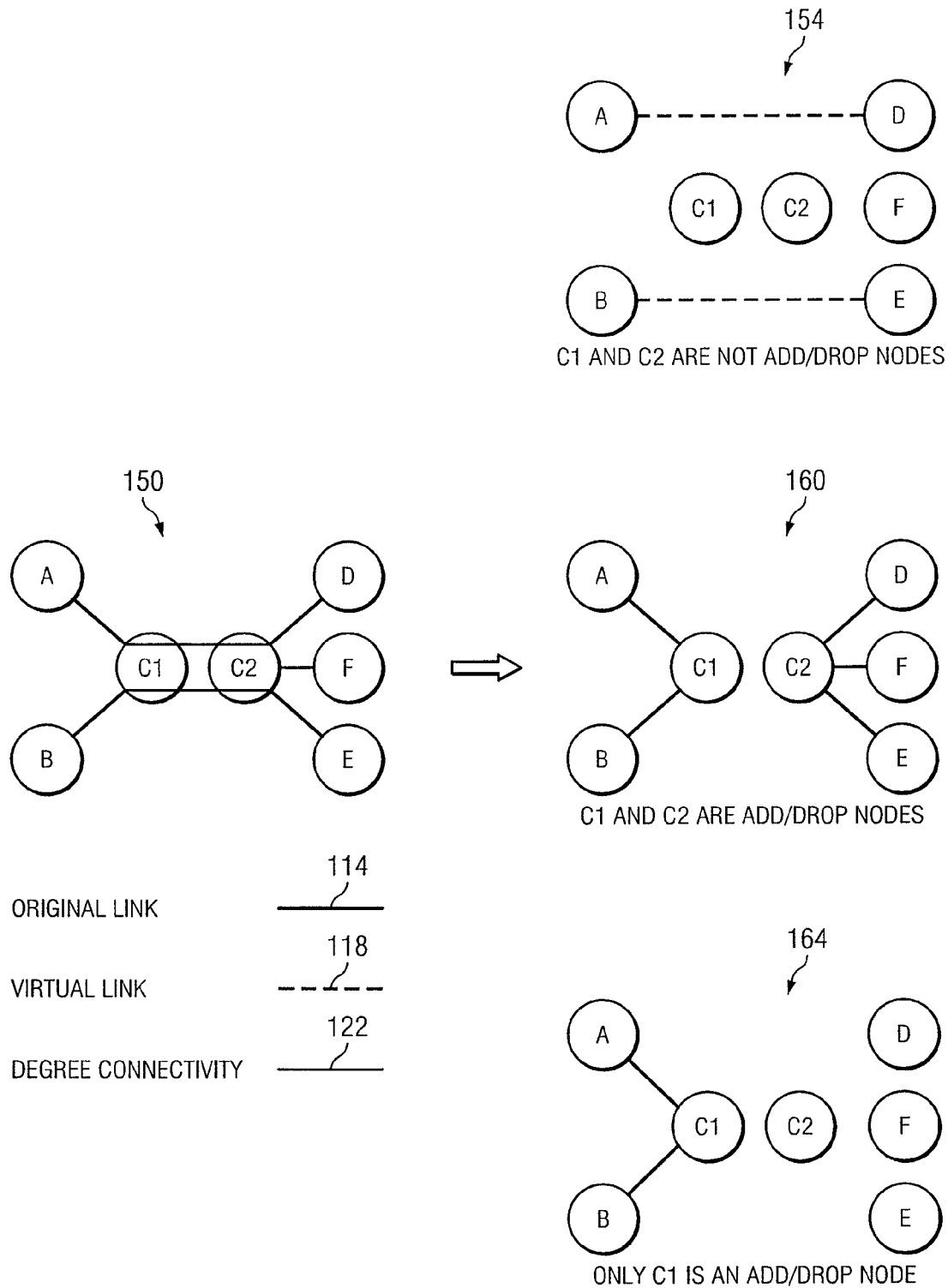

FIG. 2B illustrates an example graph 150 to which a graph transformation rule for intra-connected switches may be applied to yield transformed graphs 154, 160, and 164. A graph may include nodes A, B, C1, C2, . . . , F (where C1 and C2 are intra-connected switches), original links 114, virtual links 118, and degree connectivity 122. In the example, nodes C1 and C2 have degree connectivity between nodes A and D and between nodes B and E. In the example, traffic from node C1 cannot drop at node C2, and vice versa.

In the example, nodes C1 and C2 may each be a pass-through node or an add/drop node. If nodes C1 and C2 are pass-through nodes, then virtual links 118 are added to represent defined degree connectivity to yield transformed graph 154. In the example, virtual links 118 are added between nodes A and D (virtual link AD) and between nodes B and E (virtual link BE). Virtual links 118 representing original links 114 of pass through the same node may be placed in the same shared risk group. In the example, virtual links AD and BE are in the same shared risk group.

If nodes C1 and C2 are add/drop nodes, nodes C1 and C2 may maintain degree connectivity 122, for example, may be regarded as a symmetric switch as in transformed graph 160. There is no connection between nodes C1 and C2, since traffic from node C1 cannot drop at node C2, and vice versa.

If node C1 is an add/drop node, but node C2 is not, node C1 may maintain degree connectivity 122, for example, may be regarded as a symmetric switch as in transformed graph 164. There is no connection between nodes C1 and C2, since node C2 is not an add/drop node.

Figure 3:
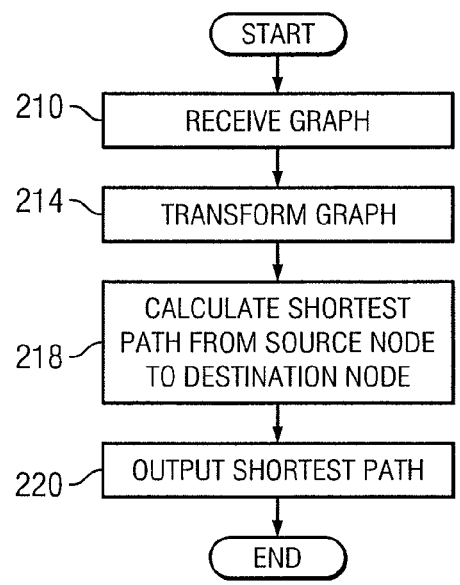
FIG. 3 illustrates an example of a method for determining paths for networks with asymmetric nodes that may be performed by the system of FIG. 1.
Figure 4:
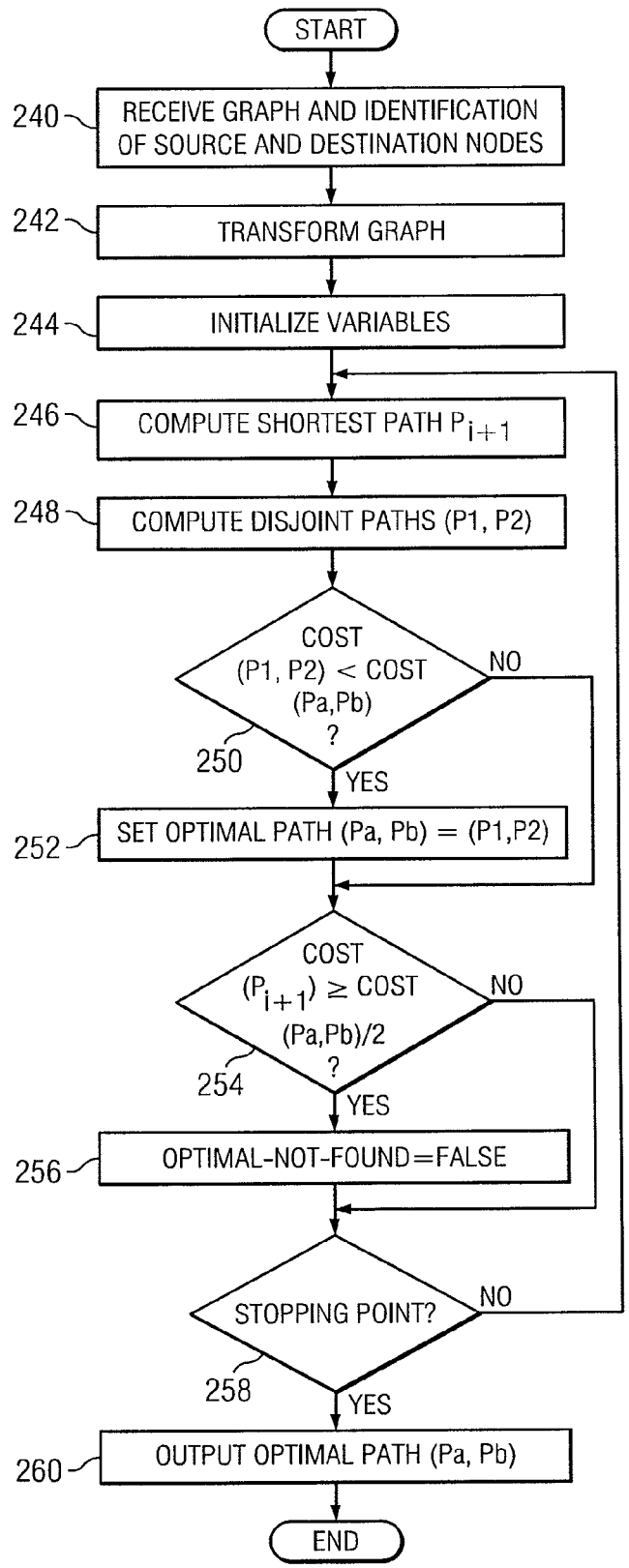
FIG. 4 illustrates another example of a method for determining paths for networks with asymmetric nodes that may be performed by the system of FIG. 1.

FIGS. 3 and 4 illustrate examples of methods for determining paths for networks with asymmetric nodes that may be performed by system 10 of FIG. 1. FIG. 3 illustrates an example of the method for determining a shortest path. The method starts at step 210, where a graph is received. The graph represents a network comprising asymmetric nodes and source and destination nodes.

The graph is transformed at step 212 to yield transformed graph 36. The transformation may use the graph transformation rules described in more detail with reference to FIGS. 2A and 2B. In the transformation, virtual links 118 of the asymmetric nodes may be enabled. In addition, the source and destination nodes may be treated as the only add/drop nodes. Accordingly, if the source or destination node is asymmetric, virtual links 118 of the asymmetric node may be disabled and original links 114 may be enabled.

A shortest path from the source node to the destination node is calculated using transformed graph 36 at step 218. Any suitable shortest path routing process may be used, for example, Dijkstra's algorithm or Breadth First Search Shortest Path (BFSSP) routing algorithm. The shortest path is output at step 220. The method then ends.

FIG. 4 illustrates an example of a method for determining Shared Routing Group (SRG) disjoint shortest paths. Any suitable parameters and variables may be used to describe the method. In the example, the parameters and variables are:

"i" represents iteration i;
"Max_Iteration" represents the maximum number of iterations;
"Px" represents path Px;
"$P_i$" represents the shortest path for iteration i;
"(Px,Py)" represents disjoint paths Px and Py;
"(Pa,Pb)" represents the current optimal pair of disjoint paths Pa and Pb;
"Cost (Px)" represents the cost of path Px;
"Cost (Px,Py)" represents the cost of paths Px and Py; and
"optimal-not-found" indicates whether an optimal path is found at an iteration.

The method starts at step 240, where a graph is received. The graph represents a network comprising asymmetric nodes and source and destination nodes. The graph is transformed at step 242 to yield transformed graph 36. The transformation may use the graph transformation rules described in more detail with reference to FIGS. 2A and 2B. In the transformation, virtual links 118 of the asymmetric nodes may be enabled. In addition, the source and destination nodes may be treated as the only add/drop nodes. Accordingly, if the source or destination node is asymmetric, virtual links 118 of the asymmetric node may be disabled and original links 114 may be enabled.

Variables are initialized at step 244. For example, the variables may be initialized as follows:

i=0;
(Pa,Pb)=null;
Cost (Px,Py)=∞; and
optimal-not-found=true.

The shortest path $P_{i+1}$ from the source node to the destination node is calculated using transformed graph 36 at step 246. Any suitable shortest path routing process may be used, for example, Dijkstra's algorithm or Breadth First Search Shortest Path (BFSSP) routing algorithm.

Disjoint paths (P1,P2) are computed for shortest path $P_{i+1}$ using transformed graph 36 at step 248. Any suitable process may be used to compute disjoint paths (P1,P2), for example, the Iterative Modified Suurballe's Heuristic (IMSH) or the Iterative Two Step Heuristic (ITSH).

According to the Iterative Modified Suurballe's Heuristic (IMSH), the following may be performed:
Input: A seed path Pi and a transformed graph.
Step 1: Disable or increase the cost of links that share risk with Pi. This step includes the original links of the virtual links along Pi.
Step 2: Reverse the links along Pi and assign negative cost to the reversed links. This step is performed to avoid negative cycles.
Step 3: Run original breadth-first search for shortest paths (BFSSP) to obtain Pi'.
Step 4: Remove the overlap of Pi and Pi' to obtain (P1, P2).
Step 5: If (P1, P2) exist and (P1, P2) are SRG-disjoint, then output (P1, P2).
Step 6: If (P1, P2) do not exist or (P1, P2) are not SRG-disjoint, then output (P1, P2)=null.

According to the Iterative Two Step Heuristic (ITSH), the following may be performed:
Input: A seed path Pi and a transformed graph.
Step 1: Disable links that share risk with Pi. This step includes the original links of the virtual links along Pi.
Step 2: Disable the links and nodes along Pi, except for the source and destination nodes.
Step 3: Run original BFSSP to obtain P2 and P1=Pi.
Step 4: If P2 exists, then output (P1,P2).
Step 5: If P2 does not exist, then output (P1, P2)=null.

At step 250, the cost of disjoint paths ("current cost" or "Cost(P1,P2)") of the current iteration may be less than the cost of optimal disjoint paths (or "previous optimal cost" or "Cost(Pa,Pb)") found a previous iteration. The cost may be determined in using any suitable process.

If Cost(P1,P2) is less than Cost(Pa,Pb), then the method proceeds to step 252, where (Pa,Pb) is set to (P1,P2) to indicate that (P1,P2) are the new optimal disjoint paths. If Cost (P1,P2) is greater than or equal to Cost(Pa,Pb), then the method proceeds to step 254.

The cost of shortest path $P_i$ (or "shortest path cost" or "Cost($P_i$)") and Cost(Pa,Pb) (or "current optional cost") are compared at step 254 to determine whether an optimal path has been found. Cost($P_i$) and Cost(Pa,Pb) may be compared in any suitable manner. In the example, Cost($P_i$) and Cost(Pa, Pb) are compared by determining whether Cost($P_i$) is greater than or equal to a function applied to Cost(Pa,Pb), such as Cost(Pa,Pb)/2.

In the example, if Cost($P_i$) is greater than or equal to Cost (Pa,Pb)/2, then the method proceeds to step 256, where optimal-not-found is set to false. If Cost($P_i$) is less than Cost(Pa, Pb)/2, then the method proceeds to step 258.

The iterations may reach a stopping point at step 258. The stopping point may be determined in any suitable manner. In certain embodiments, Max_Iterations and optimal-not-found may be used to determine the stopping point. For example, a stopping point may be reached if the current iteration i is less than or equal to Max_Iterations and optimal-not-found is set to true.

If a stopping point has not been reached, the method returns to step 246, where a shortest path is computed for the next iteration. If a stopping point has been reached, the method proceeds to step 260, where current optimal disjoint paths (Pa,Pb) are output. The method then ends.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. A subset of a set may include zero, one or more, or all elements of the set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
receiving a graph representing a network comprising a plurality of nodes, the graph comprising representations of the plurality of nodes and the links between the nodes, the plurality of nodes comprising one or more asymmetric switches, each asymmetric switch having defined degree connectivity between two or more pairs of degrees of the asymmetric switch, and where pass-through traffic can flow from an input degree to an output degree of the asymmetric switch only if degree connectivity between the input and output degrees has been defined;
transforming the graph to yield a transformed graph that accounts for the one or more asymmetric switches, wherein transforming the graph comprises, if an asymmetric switch is a pass-through node, adding two or more virtual links to the graph, each virtual link representing a defined degree connectivity between a particular pair of degrees of the asymmetric switch, each virtual link existing between a first node of the network connected to a first degree of the particular pair and a second node of the network connected to a second degree of the particular pair; and
applying a routing process to the transformed graph to yield one or more paths through the network.

2. The method of claim 1, the transforming the graph to yield the transformed graph further comprising:
if an asymmetric switch is an add/drop node, maintaining the defined degree connectivity of the asymmetric switch.

3. The method of claim 1, the one or more asymmetric switches comprising an intra-connected switch pair comprising a first switch and a second switch, the first switch having a first degree, the second switch having a second degree with degree connectivity to the first degree.

4. The method of claim 3, the transforming the graph to yield the transformed graph further comprising:
if the first switch and the second switch are pass-through nodes, adding a second virtual link to the graph, the second virtual link representing the defined degree connectivity between the first degree of the first switch and the second degree of the second switch, the second virtual link existing between a third node of the network connected to the first degree of the first switch and a fourth node of the network connected to a second degree of the second switch.

5. The method of claim 3, the transforming the graph to yield the transformed graph further comprising:
if the first switch and the second switch are add/drop nodes, maintaining the defined degree connectivity of the first switch and the second switch.

6. The method of claim 3, the transforming the graph to yield the transformed graph further comprising:
if the first switch is an add/drop node, maintaining the defined degree connectivity of the first switch.

7. The method of claim 1, the applying the routing process to the transformed graph further comprising:
applying a shortest path routing process to the transformed graph.

8. The method of claim 1, the applying the routing process to the transformed graph further comprising:
repeating the following for a plurality of iterations until a stopping point is reached:
calculating a current shortest path between a source node and a destination node of the transformed graph;
computing a plurality of current disjoint paths for the current shortest path; and
determining if the current disjoint paths are optimal disjoint paths for the current iteration; and
when the stopping point has been reached, outputting the optimal disjoint paths of the current iteration at the stopping point.

9. The method of claim 1, the applying the routing process to the transformed graph further comprising:
determining if a plurality of current disjoint paths of a current iteration are optimal by:
calculating a current cost of the current disjoint paths; and
if the current cost that is less than a previous optimal cost of a plurality of previous optimal disjoint paths of a previous iteration, then determining that the current disjoint paths are optimal.

10. The method of claim 1, the applying the routing process to the transformed graph further comprising:
deciding the stopping point is reached by:
calculating a shortest path cost of a shortest path of a current iteration;
comparing the shortest path cost and a current optimal cost of a plurality of current optimal disjoint paths of the current iteration; and
deciding whether the stopping point is reached in accordance with the comparison.

11. An apparatus comprising:
one or more computer readable media configured to store a graph representing a network comprising a plurality of nodes, the graph comprising representations of the plurality of nodes and the links between the nodes, the plurality of nodes comprising one or more asymmetric switches, each asymmetric switch having defined degree connectivity between two or more pairs of degrees of the asymmetric switch, and where pass-through traffic can flow from an input degree to an output degree of the asymmetric switch only if degree connectivity between the input and output degrees has been defined; and
one or more processors configured to:
transform the graph to yield a transformed graph that accounts for the one or more asymmetric switches, wherein transforming the graph comprises, if an asymmetric switch is a pass-through node, adding two or more virtual links to the graph, each virtual link representing a defined degree connectivity between a particular pair of degrees of the asymmetric switch, each virtual link existing between a first node of the network connected to a first degree of the particular pair and a second node of the network connected to a second degree of the particular pair; and
apply a routing process to the transformed graph to yield one or more paths through the network.

12. The apparatus of claim 11, the one or more processors configured to transform the graph to yield the transformed graph by:

if an asymmetric switch is an add/drop node, maintaining the defined degree connectivity of the asymmetric switch.

13. The apparatus of claim 11, the one or more asymmetric switches comprising an intra-connected switch pair comprising a first switch and a second switch, the first switch having a first degree, the second switch having a second degree with degree connectivity to the first degree.

14. The apparatus of claim 13, the one or more processors configured to transform the graph to yield the transformed graph by:
if the first switch and the second switch are pass-through nodes, adding a second virtual link to the graph, the second virtual link representing the defined degree connectivity between the first degree of the first switch and the second degree of the second switch, the second virtual link existing between a third node of the network connected to the first degree of the first switch and a fourth node of the network connected to a second degree of the second switch.

15. The apparatus of claim 13, the one or more processors configured to transform the graph to yield the transformed graph by:
if the first switch and the second switch are add/drop nodes, maintaining the defined degree connectivity of the first switch and the second switch.

16. The apparatus of claim 13, the one or more processors configured to transform the graph to yield the transformed graph by:
if the first switch is an add/drop node, maintaining the defined degree connectivity of the first switch.

17. The apparatus of claim 11, the one or more processors configured to apply the routing process to the transformed graph by:
applying a shortest path routing process to the transformed graph.

18. The apparatus of claim 11, the one or more processors configured to apply the routing process to the transformed graph by:
repeating the following for a plurality of iterations until a stopping point is reached:
calculating a current shortest path between a source node and a destination node of the transformed graph;
computing a plurality of current disjoint paths for the current shortest path; and
determining if the current disjoint paths are optimal disjoint paths for the current iteration; and
when the stopping point has been reached, outputting the optimal disjoint paths of the current iteration at the stopping point.

19. The apparatus of claim 11, the one or more processors configured to apply the routing process to the transformed graph by:
determining if a plurality of current disjoint paths of a current iteration are optimal by:
calculating a current cost of the current disjoint paths; and
if the current cost that is less than a previous optimal cost of a plurality of previous optimal disjoint paths of a previous iteration, then determining that the current disjoint paths are optimal.

20. The apparatus of claim 11, the one or more processors configured to apply the routing process to the transformed graph by:
deciding the stopping point is reached by:
calculating a shortest path cost of a shortest path of a current iteration;
comparing the shortest path cost and a current optimal cost of a plurality of current optimal disjoint paths of the current iteration; and
deciding whether the stopping point is reached in accordance with the comparison.

* * * * *